(12) United States Patent
Murakami

(10) Patent No.: US 8,744,142 B2
(45) Date of Patent: Jun. 3, 2014

(54) PRESENTING INFORMATION BASED ON WHETHER A VIEWER CORRESPONDING TO INFORMATION IS STORED IS PRESENT IN AN IMAGE

(75) Inventor: Masatoshi Murakami, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 522 days.

(21) Appl. No.: 12/787,307

(22) Filed: May 25, 2010

(65) Prior Publication Data

US 2010/0296707 A1 Nov. 25, 2010

(30) Foreign Application Priority Data

May 25, 2009 (JP) ................................. 2009-125606

(51) Int. Cl.
*G06K 9/00* (2006.01)
(52) U.S. Cl.
USPC ........... 382/118; 382/103; 382/115; 382/116; 382/117
(58) Field of Classification Search
USPC ......................................... 382/103, 115–118
See application file for complete search history.

(56) References Cited

U.S. PATENT DOCUMENTS

| | | | | |
|---|---|---|---|---|
| 5,982,912 | A * | 11/1999 | Fukui et al. | 382/118 |
| 6,151,424 | A * | 11/2000 | Hsu | 382/294 |
| 7,158,177 | B2 | 1/2007 | Kage et al. | |
| 7,158,657 | B2 | 1/2007 | Okazaki et al. | |
| 7,426,292 | B2 * | 9/2008 | Moghaddam et al. | 382/154 |
| 7,444,013 | B2 * | 10/2008 | Chen | 382/154 |
| 7,555,619 | B2 * | 6/2009 | Harris | 711/162 |
| 7,636,456 | B2 | 12/2009 | Collins et al. | |
| 7,701,437 | B2 | 4/2010 | Thursfield | |
| 7,831,141 | B2 * | 11/2010 | Wassingbo et al. | 396/429 |
| 7,861,089 | B2 * | 12/2010 | Tomita | 713/182 |
| 2001/0013895 | A1 * | 8/2001 | Aizawa et al. | 348/222 |
| 2001/0021305 | A1 * | 9/2001 | Sugiyama et al. | 386/46 |
| 2005/0031196 | A1 * | 2/2005 | Moghaddam et al. | 382/154 |
| 2005/0271302 | A1 * | 12/2005 | Khamene et al. | 382/294 |
| 2007/0033607 | A1 * | 2/2007 | Bryan | 725/10 |
| 2007/0206880 | A1 * | 9/2007 | Chen et al. | 382/294 |
| 2008/0052945 | A1 * | 3/2008 | Matas et al. | 34/173 |
| 2008/0112621 | A1 | 5/2008 | Gallagher et al. | |
| 2008/0313568 | A1 * | 12/2008 | Park et al. | 715/835 |

(Continued)

FOREIGN PATENT DOCUMENTS

JP 2000-175117 A 6/2000
JP 2000-244673 A2 9/2000

(Continued)

OTHER PUBLICATIONS

JP2006-236218 machine english translation, pp. 1-15, Dec. 10, 2012.*

(Continued)

*Primary Examiner* — Jayesh A Patel
(74) *Attorney, Agent, or Firm* — Knobbe, Martens, Olson & Bear, LLP

(57) ABSTRACT

According to one embodiment, an information reproducing method including, fetching facial image data of a viewer, extracting feature points on a face of the viewer from the fetched facial image data, and coding the feature points, comparing the coded feature points with viewer feature-point information stored in a management table, and presenting different pieces of information depending upon whether a viewer corresponding to the viewer feature-point information stored in the management table is present or not.

9 Claims, 14 Drawing Sheets

| No. | Presence | Time zone | Upper right | Lower righ | Upper left | Lower left |
|---|---|---|---|---|---|---|
| | Principal alone is seeing (ID)/family members alone are present/ persons other than family members are also present | Morning 5:00– Day 11:00– Evening 16:00– Night 20:00– Midnight 23:00– All | | | | |
| 1 | Other than family members | Day, evening, night | Clock | Weather | – | Calendar |
| 2 | Family members only | All | Clock | – | – | Electric power |
| 3 | 1 | Morning | Clock | Weather | Operating state of trains | – |
| 4 | 2 | Morning | Clock | Weather | Temperature/ humidity | Special sales information |
| 5 | 2 | Morning, day, evening, night | Clock | Stock price | Temperature/ humidity | Electric power |
| 6 | 3 | Evening, night, midnight | Clock | Weather | Photographs (slideshow) | Music (MP3 player) |
| ... | 1 | Day, evening, nigh, midnight | Clock | Weather | Stock price | Calendar |

(56) References Cited

U.S. PATENT DOCUMENTS

| | | |
|---|---|---|
| 2009/0100377 A1 | 4/2009 | Miyamoto et al. |
| 2009/0133051 A1* | 5/2009 | Hildreth .......................... 725/28 |
| 2009/0138805 A1* | 5/2009 | Hildreth ........................ 715/745 |
| 2010/0083128 A1* | 4/2010 | Kon et al. ...................... 715/741 |
| 2010/0135594 A1* | 6/2010 | Allebach et al. .............. 382/275 |
| 2010/0246905 A1* | 9/2010 | Yuasa et al. ................... 382/118 |
| 2011/0043475 A1* | 2/2011 | Rigazio et al. ................. 345/173 |
| 2011/0069940 A1* | 3/2011 | Shimy et al. .................. 386/296 |
| 2011/0070819 A1* | 3/2011 | Shimy et al. .................. 455/3.05 |
| 2011/0110564 A1* | 5/2011 | Tabe .............................. 382/118 |
| 2011/0249144 A1* | 10/2011 | Chang ......................... 348/231.3 |

FOREIGN PATENT DOCUMENTS

| | | |
|---|---|---|
| JP | 2000-322358 A | 11/2000 |
| JP | 2001-005967 A2 | 1/2001 |
| JP | 2001-160145 A2 | 6/2001 |
| JP | 2001-203819 A | 7/2001 |
| JP | 2001-268387 | 9/2001 |
| JP | 2002-92013 A2 | 3/2002 |
| JP | 2002-259335 A | 9/2002 |
| JP | 2003-108935 A | 4/2003 |
| JP | 2003-174598 A | 6/2003 |
| JP | 2004-534317 A | 11/2004 |
| JP | 2005-267146 A | 9/2005 |
| JP | 2005-267611 A | 9/2005 |
| JP | 2006-236218 | 9/2006 |
| JP | 2007-028077 A2 | 2/2007 |
| JP | 2007-279776 A2 | 10/2007 |
| JP | 2008-009694 A | 1/2008 |
| JP | 2008-033862 A | 2/2008 |
| JP | 2008-136252 A2 | 6/2008 |
| JP | 2008-165009 A | 7/2008 |
| JP | 2009-027221 A2 | 2/2009 |
| JP | 2009-098825 A | 5/2009 |
| JP | 2010-016432 A | 1/2010 |

OTHER PUBLICATIONS

Notice of Reasons for Rejection mailed Aug. 10, 2010 in corresponding Japanese Pat. App. No. 2009-125606 in seven (7) pages.
Decision of Rejection mailed Jan. 11, 2011 in corresponding Japanese Pat. App. No. 2009-125606 in four (4) pages.
Official Letter of Inquiry mailed Oct. 4, 2011 in corresponding Japanese Pat. App. No. 2009-125606 in seven (7) pages.
Notice of Reasons for Rejection mailed Dec. 4, 2012 in corresponding Japanese Pat. App. No. 2011-087218 in nine (9) pages.
Notice of Reasons for Rejection for Japanese Pat. App. No. 2009-070975, mailed Jun. 15, 2010.
Decision of Rejection for Japanese Pat. App. No. 2011-087218, mailed Aug. 27, 2013.

* cited by examiner

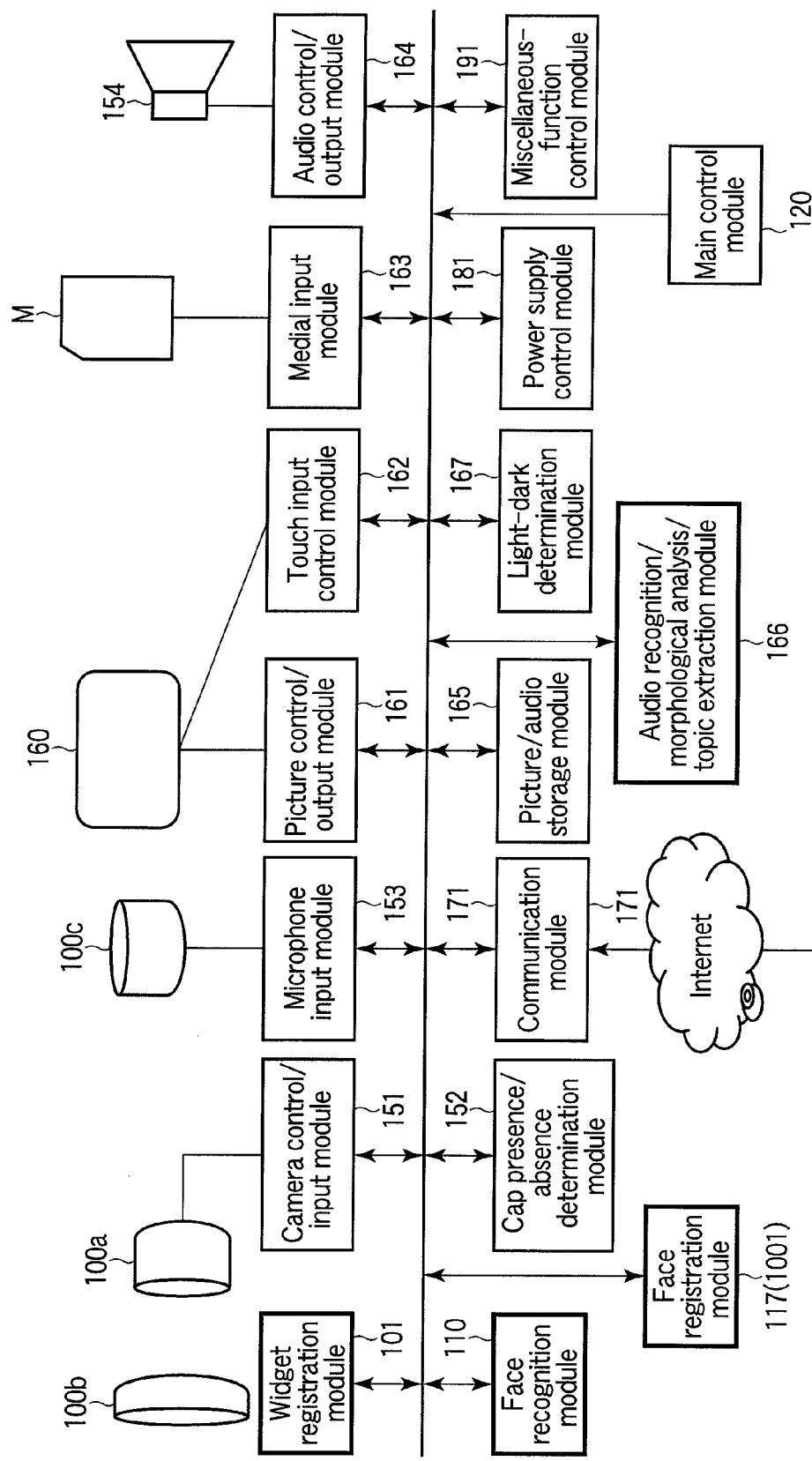
F I G. 2

| No. | Presence | Time zone | Upper right | Lower righ | Upper left | Lower left |
|---|---|---|---|---|---|---|
|  | Principal alone is seeing (ID)/family members alone are present/persons other than family members are also present | Morning 5:00–<br>Day 11:00–<br>Evening 16:00–<br>Night 20:00–<br>Midnight 23:00–<br>All |  |  |  |  |
| 1 | Other than family members | Day, evening, night | Clock | Weather | — | Calendar |
| 2 | Family members only | All | Clock | — | — | Electric power |
| 3 | 1 | Morning | Clock | Weather | Operating state of trains | — |
| 4 | 2 | Morning | Clock | Weather | Temperature/humidity | Special sales information |
| 5 | 2 | Morning, day, evening, night | Clock | Stock price | Temperature/humidity | Electric power |
| 6 | 3 | Evening, night, midnight | Clock | Weather | Photographs (slideshow) | Music (MP3 player) |
| ... | 1 | Day, evening, nigh, midnight | Clock | Weather | Stock price | Calendar |

FIG. 3

| ID | Family | Identification code (mail address) |
|---|---|---|
| 1 | | abcd@face.family1.~ |
| 2 | | aacd@face.family1.~ |
| 3 | | bbcd@face.family1.~ |
| ... | No registration | xxyy@face.kaisha.~ |

FIG. 4

| Contents | Input#1 | Input#2 | Input#3 | ... | |
|---|---|---|---|---|---|
| Weather | Place | Date and hour | — | — | |
| Gourmet | Place | Night | Lunch | Tea time | |
| Souvenir | Place | Very popular | good sale able? | Standard | |

FIG. 5

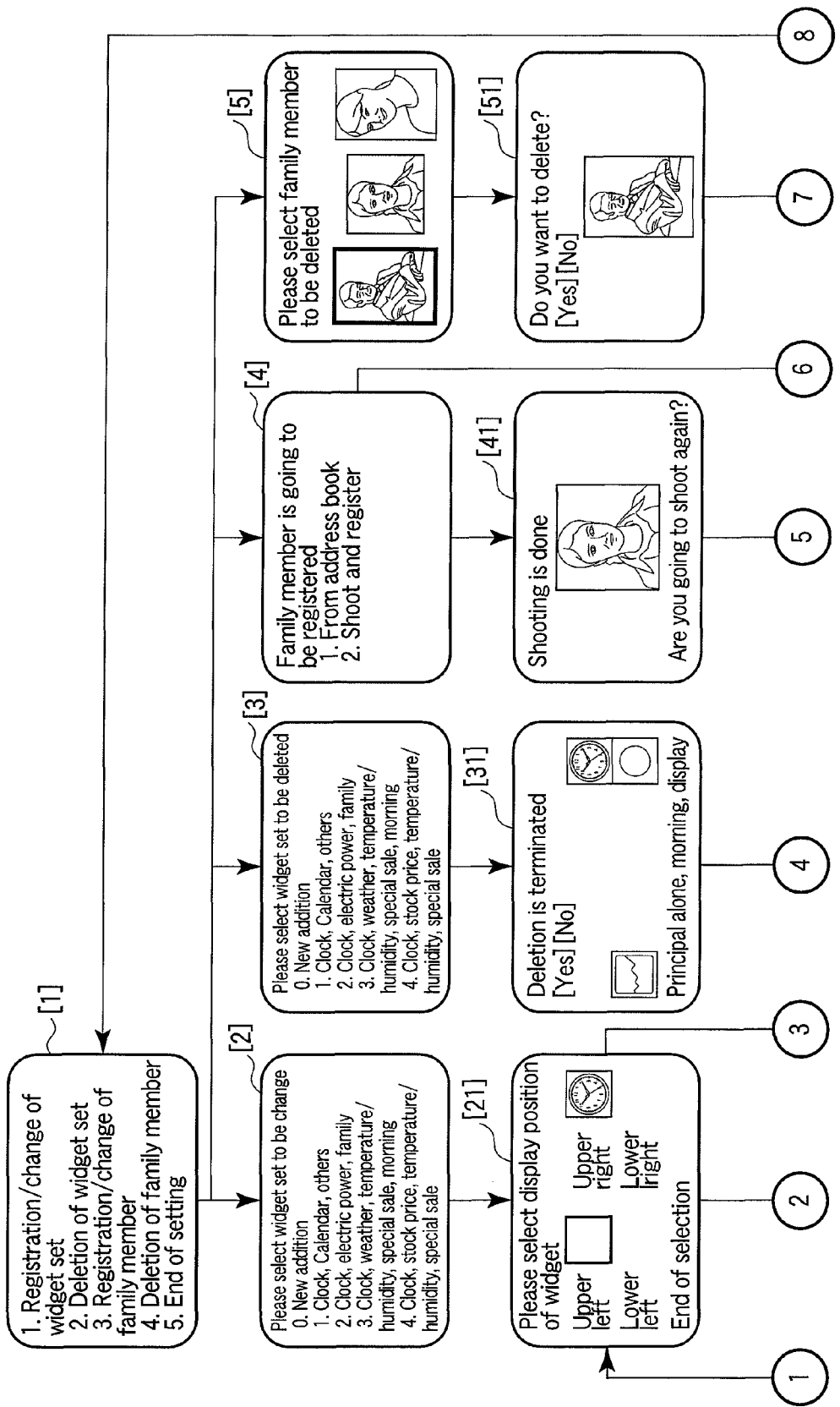
F I G. 11A

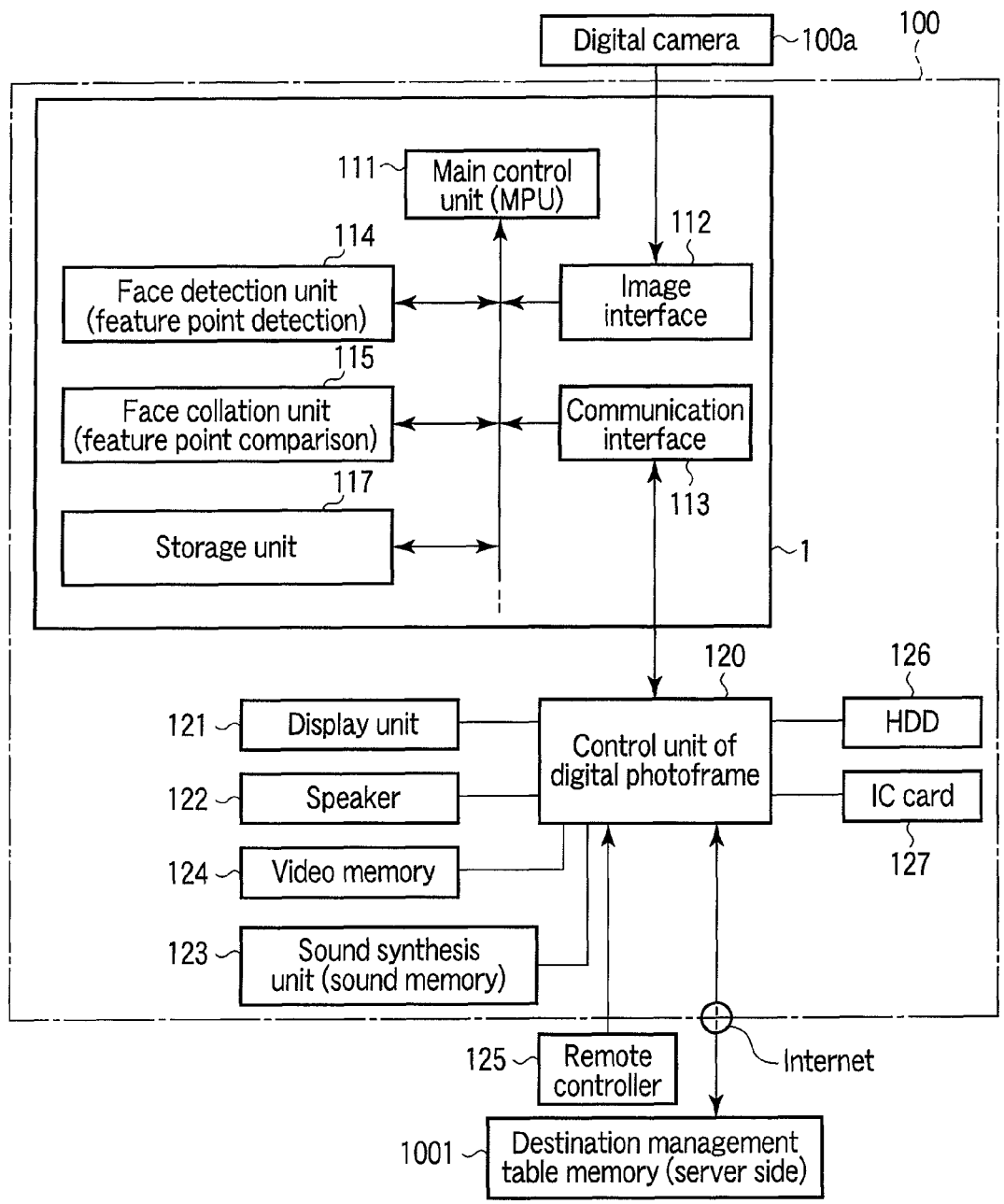
F I G. 15

PRESENTING INFORMATION BASED ON WHETHER A VIEWER CORRESPONDING TO INFORMATION IS STORED IS PRESENT IN AN IMAGE

CROSS-REFERENCE TO RELATED APPLICATIONS

This application is based upon and claims the benefit of priority from Japanese Patent Application No. 2009-125606, filed May 25, 2009; the entire contents of which are incorporated herein by reference.

FIELD

Embodiments described herein relate generally to a method and an apparatus for reproducing a picture and an audio that selects and reproduces the picture and the audio in accordance with a viewing user.

BACKGROUND

As picture/audio reproducers that reproduce pictures and audio, various devices such as television receivers, monitor devices, player devices, video cameras, personal computers, portable terminals and digital photoframes have been put to practical use and have already come into wide use.

Further, with the fulfillment of networks and the increase in speed and capacity thereof, content items (programs) as reproduction targets are unilaterally supplied from a transmission side (delivery station) through, e.g., electromagnetic waves or an optical fiber, and they can be also acquired at an arbitrary time according to a request from a viewer based on the spread of an on-demand scheme.

Furthermore, with the spread of a widget (information screen) that can independently display a news telop provided on a network or information in a preset specific field in a screen of a television receiver, a digital photoframe, or a personal computer, a picture or audio provided at a viewpoint different from a request from a viewer based on the on-demand scheme can be acquired and reproduced.

Meanwhile, for example, when a viewer and his/her family set an arbitrary number of widgets (information screens) in a digital photoframe installed in a living room for selfish reasons, the widgets are hard to see for the respective persons. Moreover, when they have a visitor, they must take actions, e.g., turning off the digital photoframe or hiding the same so that the visitor cannot see it.

Japanese Patent Application Publication (KOKAI) No. 2006-236218 discloses an electronic album display system that detects a viewer and selects and displays images concerning the detected viewer.

Although the electronic album display system disclosed in this literature detects a viewer and displays images (photographs) concerning the viewer, but it also displays unwilling images that the viewer does not want other persons to see since this system displays images even though the viewer and other persons share the system at the same time.

BRIEF DESCRIPTION OF THE DRAWINGS

FIG. 2 is an exemplary diagram showing an example of a configuration of a digital photoframe that is incorporated in the system depicted in FIG. 1 and is an example of a picture/audio reproducer that can be preferably applied to a picture/audio reproduction system, according to an embodiment;

FIG. 3 is an exemplary diagram showing an example of a widget management table that is applied to the system depicted in FIG. 1 and manages settings of reproducing conditions (widget [information screen]) of a picture or audio for each viewer, according to an embodiment;

FIG. 4 is an exemplary diagram showing an example of a family ID management table to which the widget management table makes reference, according to an embodiment;

FIG. 5 is an exemplary diagram showing an example of a widget input information table to which the widget management table depicted in FIG. 3 makes reference, according to an embodiment;

FIGS. 11A, 11B and 11C are an exemplary diagram showing an example of a description on a method for setting a widget that can meet specific conditions for each viewer to the picture/audio reproducer (digital photoframe depicted in FIG. 2) incorporated in the system shown in FIG. 1 (screen transition example), according to an embodiment;

FIG. 15 is an exemplary diagram showing an example of a face authentication/collation processing apparatus applied to the picture/audio reproducer incorporated in the system depicted in FIG. 1, according to an embodiment.

DETAILED DESCRIPTION

In general, according to one embodiment, an information reproducing method comprising: fetching facial image data of a viewer; extracting feature points on a face of the viewer from the fetched facial image data, and coding the feature points; comparing the coded feature points with viewer feature-point information stored in a management table; and presenting different pieces of information depending upon whether a viewer corresponding to the viewer feature-point information stored in the management table is present or not.

Embodiments will now be described hereinafter in detail with reference to the accompanying drawings.

Figure 1:
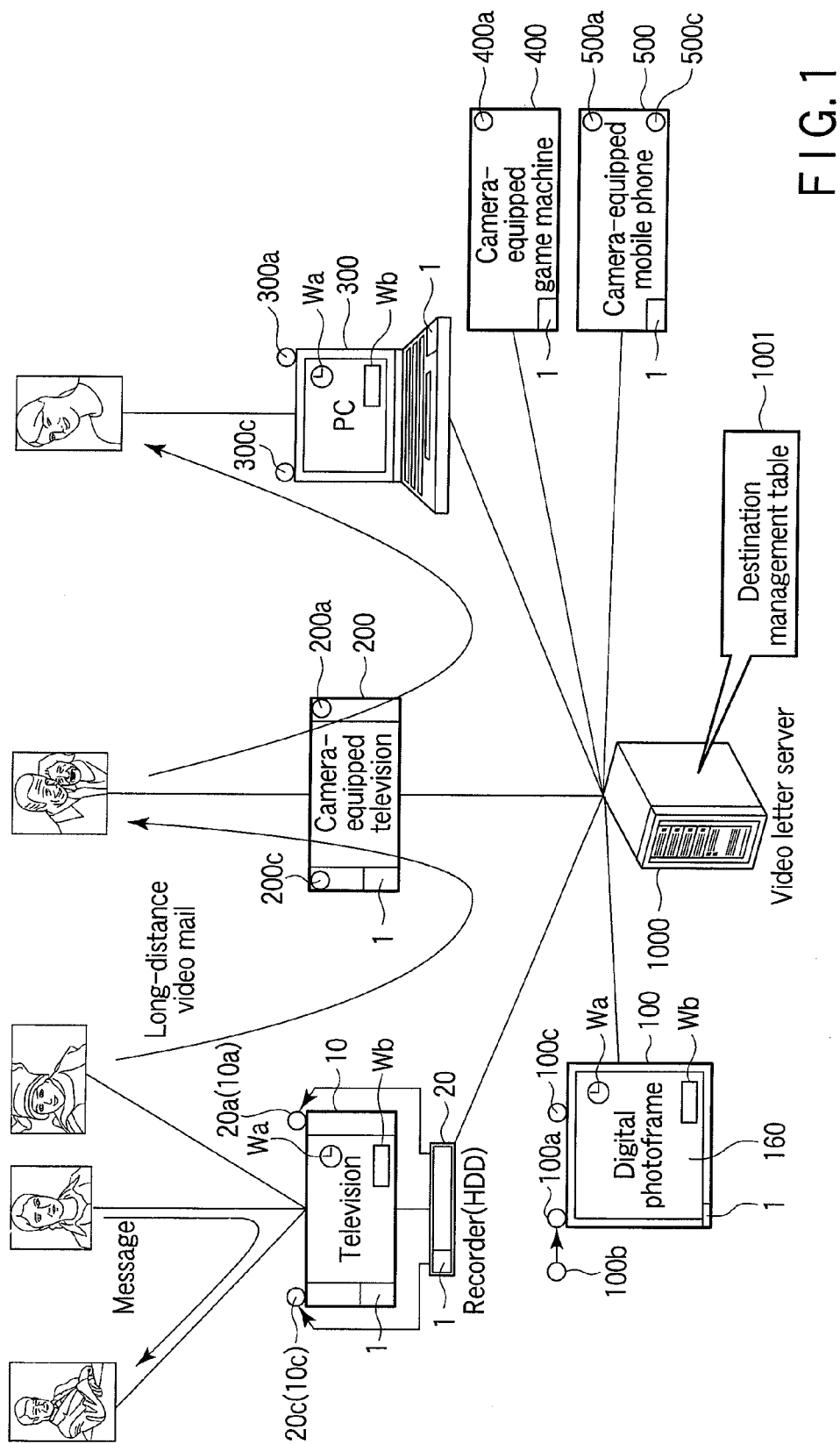
FIG. 1 is an exemplary diagram showing an example of a picture/audio reproduction system that performs face authentication to which an embodiment can be applied and reproduces a picture or audio set under specific conditions in accordance with each viewer according to the embodiment.

FIG. 1 shows an outline of the whole e-mail system using face authentication. In addition, the systems described herein can be implemented as software applications, hardware and/or software modules, or components on one or more computers, such as servers. While the various modules are illustrated separately, they may share some or all of the same underlying logic or code.

A picture/audio reproduction system that is schematically shown in FIG. 1 and uses face authentication to reproduce pictures or audio set under specific conditions in accordance with each viewer is constituted of at least one of a television receiver (domestic user terminal 1) 10, a video recorder (domestic user terminal 2) 20, and a picture/audio reproducer (domestic user terminal 3) 100 in addition to a video letter server 1000 that is mutually connected with each of the domestic user terminals (1 to 3) through a network, e.g., an optical fiber network or a public telecommunication network. The television receiver 10 receives television broadcast signals provided from a broadcaster or a relay broadcaster by radio using electromagnetic waves or by a wired transmission method using, for example, optical fibers, and then reproduces the television broadcast signals. The video recorder 20 retains a high-capacity storage typified by a hard disk drive (HDD). The picture/audio reproducer 100 is typified by, e.g., a digital photoframe.

A camera-equipped television device 200 (user terminal 4), a personal computer (PC) 300 (user terminal 5), a camera-equipped game machine 400 (user terminal 6), and a camera-equipped cellular telephone 500 (user terminal 7) can arbitrarily access the video letter server 100 through a network, e.g., the Internet. The camera-equipped television device 200 and the personal computer 300 are provided in a place different from the place where any one of the domestic user terminals 1 to 3, i.e., the television receiver 10, the video recorder 20, or the digital photoframe 100 is installed. For example, the camera-equipped television device 200 and the personal computer 300 are provided at arbitrary positions in the house of a relative or an acquaintance. The camera-equipped game machine 400 and the camera-equipped cellular telephone 500 are, for example, portable terminals which can access an external network.

The video letter server 100 temporarily retains, for example, a mail (video mail), a picture, or a moving image file sent from the domestic user terminal (television receiver 10, the video recorder 20 or the photoframe 30, and a sender operating the same), and reports to a partner (recipient) that the mail (video mail), the picture, or the moving image file has been received. It is to be noted that existing content items can be attached to the video mail, in addition to the image/voice of the user (i.e., the sender) who is in front of a camera (10a, 20a, or 100a) affixed to the television receiver 10, the video recorder 20, or the digital photoframe 100. The existing content items (only to the extent that does not infringe on the rights of others, for example, a copyright) include video pictures taken by the user, digital camera images taken by the user, audio/music recorded by the user, pictures/audio (music) of broadcast programs recorded on the video recorder, and pictures/audio (music) distributed on the Internet belonging to the public domain. Further, if the camera 20a is affixed to the video recorder 20 connected with the television receiver 10 and the camera 10a is likewise affixed to the television receiver 10, this configuration is redundant. Therefore, a description will be given as to an example where the camera 20a affixed to the recorder 20 placed near the television receiver 10 is used as a representative (television device 10 does not have a camera).

The partner (recipient) retaining the camera-equipped digital television device 200, the personal computer (PC) 300, the camera-equipped game machine 400, or the cellular telephone 500 that is connected to the video letter server 1000 on the network (that can access the video letter server 1000) can reproduce, at an arbitrary timing, not only the pictures/audio sent by the user (i.e., the sender) in front of the camera 20a affixed to the video recorder 20 integrally utilized with the television receiver 10 or the camera 100a affixed to the digital photoframe 100 but also the content items added thereto. It is to be noted that each of the television device 10 (or the recorder 20) and the digital photoframe 100 includes a microphone 10c (20c) or 100c that fetches voice of a person, i.e., a viewer who is present (seated) in front of or near each device in addition to the camera 10a (20a) or 100a.

Furthermore, a face authentication/collation processing apparatus 1 described later with FIG. 15 is incorporated in each of the sending end user terminal (10, 20, 100) and the receiving end terminal (200, 300, 400, 500). The face authentication/collation processing apparatus 1 can code the features of the face of the user in front of the camera (20a, 100a, 200a, 300a, 400a, 500a) integrally provided in each user terminal, or collate the features of the face of the user in front of the camera with the features of a registered face. Moreover, data on the image of the face of the user taken in by the camera of each user terminal, feature point data in which the features of the face are coded by the face authentication/collation processing apparatus 1, etc. are registered on a destination management table 1001 provided in the server 1000.

The video mail (mail content items) from each user itself is associated with the content items registered on the destination management table 1001, and stored in a data storage area (high-capacity storage) in the server 1000 (not shown).

In the picture/audio reproduction system depicted in FIG. 1, the face image which can be visually recognized by the user himself/herself can be used as an address to send and receive home message mails via a domestic local area network of the user. It is also possible to, via the Internet, send a video mail to another user (e.g., a relative or an acquaintance) situated in a remote place and receive a video mail from each user.

It is to be noted that, in the house of the sending end user or the house of the receiving end user, the content items in the destination management table 1001 can be copied to, for example, an unshown HDD (high-capacity storage) of the television device 10 or the recorder 20, or a semiconductor memory device (HDD in some cases) of the digital photoframe 100, or to a similar storage of the PC (personal computer) 300 or the camera-equipped television device 200. Thus, a device such the television device 10, the recorder 20, or the digital photoframe 100 can be independently used to exchange video mails (or messages) at home.

At this time, if a message is set to "public (all family members can see)", the message can be communicated to any family member (person at home) who has turned on the television device 10 at home or a person who is in front of the digital photoframe 100 (person present, i.e., a viewer recognized by the camera 100a). It is to be noted that the video mail or message can be easily opened to the public at home if the television device 10 or the recorder 20 (or the digital photoframe 100) functions as a home server.

Incidentally, it is needless to say that the server 1000 is present on the Internet (network), a facial image having the video mail itself (=content items) and the destination management table in that server corresponds to a destination, and a mail address is used when outputting to the Internet.

Additionally, information concerning a television program that is currently watched (viewed) by the user or content items that are currently in a reproduction process is associated with a facial image of the user taken by the camera, respective preferences are learned, and an obtained result is held in the server 1000 for a fixed period, whereby a company that can be connected through the server can transmit an advertisement mail according to, e.g., thoughts of the user unerringly. In this case, a video advertisement is put in a mail list, which comes under the user's observation.

FIG. 2 shows a system logic of the digital photoframe as an example of the picture/audio reproducer that is preferably applicable to the picture/audio reproduction system incorporated in the system depicted in FIG. 1.

The digital photoframe 100 includes a camera control/input unit 151 that takes in a picture from the camera 100a, a microphone input unit 153 that takes in audio from the microphone 100c, a picture control/output unit 161 that outputs a picture to a touch panel (touch screen) integrally formed in a display unit 160, a touch input control unit 162 that accepts an input from the touch panel 160 and outputs a predetermined control signal, and others. It is to be noted that a cap presence/absence determination unit 152 uses an output from the camera control/input unit 151 to determine whether a cover (cap) 100b is still put on the camera 100a. For example, when the cap presence/absence determination unit 152 has detected that the camera 100a cannot taken in a picture, display of a widget and reproduction of content items which will be explained later are not executed.

A widget registration unit 101 selectively operates an arbitrary number of set widgets (information screens), which can reproduce pictures and audio (content items) reproduced by the display unit 160 of the digital photoframe 100 and a speaker (audio reproducer) 154 connected with a later-described audio control/output unit 164 in many reproduction conformations, in accordance with one of the registration, the change, and, the deletion operations of the user (viewer). It is to be noted that, as well known, the widget is an information screen that can reproduce one or more pictures or photographs (still images) or music and the like in a display region of the display unit 160 of the digital photoframe 100 or the display unit of the television receiver 1, and selected widgets can provide various desired operations independently from a reproduction state of a photograph (still image) or the like currently reproduced by the digital photoframe 100. For example, FIG. 1 schematically shows a state that two widgets Wa and Wb are set in the display unit 160 of the digital photoframe 100 or the display device of the television receiver 10.

The digital photoframe 10 also includes a media input unit 163 that takes in a picture (photographic data) supplied with a semiconductor memory, e.g., a memory card being used as a medium, the audio control/output unit 164 that outputs audio or music when a picture (content items) reproduced by the widget entails it, a picture/audio recording unit 165 that holds input picture and music data, a audio recognition/morphological analysis/topic extraction unit 166 that recognizes audio acquired by the microphone 100c, analyzes morphemes, and extracts a topic (keyword), and others. It is to be noted that a light-dark determination unit 167 detects brightness in an environment where the digital photoframe 100 is installed, i.e., a room where a viewer is present, and it is beneficial for the control, e.g., adjusting brightness of a picture displayed in the widget and the display unit 160 in accordance with the detected brightness in the room and detecting a change, i.e., turning off lighting equipment to stop reproduction of the picture of the widget and the digital photoframe 100 itself.

The digital photoframe 100 further includes a communication unit 171, a power supply control unit 181, and others. The communication unit 171 enables accessing the video letter server 1000 connected through the network (which is mainly the Internet) or the other domestic user terminals connected through this server 1000, i.e., the camera-equipped television device 200 and the personal computer (PC) 300 which are provided in arbitrary positions in, e.g., the house of a relative or an acquaintance different from the place where the digital photoframe 100 is installed, or the portable terminals that can access the external network, e.g., the camera-equipped game machine 400 or the camera-equipped cellular phone 500. The power supply control unit 181 executes control over ON (display of pictures) or OFF (non-display of pictures) of the display unit 160 of the digital photoframe 100, activating conditions (specification of a time zone) using a timer function, and others. It is to be noted a miscellaneous-function control unit (extended function control unit) 191 utilized for, e.g., transferring signals with respect to various undescribed external devices, e.g., a high-capacity storage (HDD) or a Universal Serial Bus (USB) is also provided in the digital photoframe 100.

FIG. 3 shows an example of a widget management table that manages a setting of reproducing conditions (widget [information screen]) for pictures or audio of each viewer applied to the system depicted in FIG. 1.

When preparing an arbitrary number of widgets in the digital photoframe 100 and enabling an operation thereof, situations can be classified as follows, for example:

(a) a situation where a viewer is a device operator (widget setter) himself/herself;

(b) a situation where viewers are a device operator himself/herself and his/her family; and (c) a situation where viewers are a device operator himself/herself and any other member than the device operator's family, e.g., a friend. It is to be noted that the device operator is a person who is present in front of the digital photoframe 100 or near the digital photoframe so that he/she can see pictures of the digital photoframe and, when the number of the device operator is one, and a person called the principal is recognized as a widget setter. Further, the family denotes a group of specific present persons who are allowed to view in advance (in case of persons other than the family, relatives living together correspond to this group).

For example, if the viewer is a person other than a device operator himself/herself and a picture (content items) reproduced by a widget can be determined as being undesirable to be seen by other persons than the device operator himself/herself or persons sitting next to the device operator himself/herself, e.g., if an infertile friend is to see a picture that a registered person himself/herself is playing with his/her child, the above classification is useful when requiring a determination on, e.g., excluding pictures of the child as pictures (content items reproduced by the widget) reproduced by the digital photoframe 100.

FIG. 3 shows an example of a management table that enables selecting the situations (a) to (c) in accordance with information of a viewer taken in by the camera 100a, and classification can be performed as follows:

Presence (who is watching?)—
A viewer (principal) alone (is watching);
(principle and) his/her family alone (are watching); and
persons other than the family <e.g., friends> (are watching, or <a widget set in a company, i.e., a personal computer at a work place by the principal>.

It is to be noted that the widget reproduced in the display unit of the digital photoframe 100 (or the television receiver 10) can be classified as follows in accordance with a time zone during which reproduction is carried out:

Time (time zone during which the widget is reproduced)—
morning [from 5 am];
day [from 11 am];
evening [from 4 pm];
night [from 8 pm];
midnight [from 11 pm]; and]
ALL (all day).

For example, it is desirable that discount information or the like of the day at a supermarket is displayed during the morning and the daytime, but an arbitrary number of pictures are reproduced in the slideshow style and music or the like suitable for the night time zone is reproduced during the nighttime and the midnight after the end of operating hours of the supermarket.

Further, although depending on a size of a display region of the display unit 160 (display device of the television receiver 10) of the digital photoframe 100, it can be considered that viewing photographs or pictures currently reproduced by the digital photoframe 100 (television receiver 10) is not obstructed even though the widgets are simultaneously arranged (reproduced) at approximately four positions specified as, e.g., "upper left", "upper right", "lower left", and "lower right". For example, a previously selected widget set of "calendar", "clock", "weather (forecast) (of the day)", "operating state of trains", and others can be selected and reproduced (<<display positions>>). Incidentally, in regard to display positions, it is needless to say that, if the number of widgets that simultaneously operate is approximately four, the widgets may be vertically placed at fourth positions on the right-hand side like a later-described reproduction example.

It is to be noted that the widget to be operated is occasionally changed in accordance with each combination of the viewer in the classification (widget management table) depicted in FIG. 3.

FIG. 4 shows a widget management table that manages a setting of reproduction conditions (widget [information screen]) for pictures or audio of each viewer applied to the system depicted in FIG. 1.

In FIG. 4, a previously registered family member is managed as, e.g., a principal (ID1), a relative living together (ID2), or a similar relative (ID3). It is to be noted that each family member is specified by a photograph obtained by previously shooting a face of each person or an identification code (mail address). Further, a mail address can be determined by using a photograph obtained by shooting a face. It is to be noted that a method and collation that use a face (photograph) as an address are based on "face authentication" processing/"collation" processing executed by a face authentication/collation processing apparatus 1 which will be explained later with reference to FIG. 15.

FIG. 5 shows an example of a widget input information table to which the widget management table depicted in FIG. 3 makes reference.

The digital photoframe (see FIG. 2) or the television receiver 10 as the picture/audio reproducer applied to the picture/audio reproduction system depicted in FIG. 1 uses the audio recognition/morphological analysis/topic extraction unit 166 to extract a topic (keyword) from a conversation of a viewer, e.g., a user (family member) or a visitor (friend) who is watching pictures (and audio [music]) or listening to music reproduced by an arbitrary picture/audio reproducer. For example, when a keyword (topic) that appears in the conversation is travel, weather information at a travel destination can be acquired and reproduced through the network (Internet). Furthermore, the keyword is the travel, food information ("gourmet" information), a souvenir ranking list, and others in that region can be reproduced. It is to be noted that the widget input information table can arbitrarily hold information like "Input#1", "Input"2", . . . "Input#n (n is a positive integer)" in accordance with a keyword input, i.e., a keyword that can be extracted from the conversation.

Figure 6:
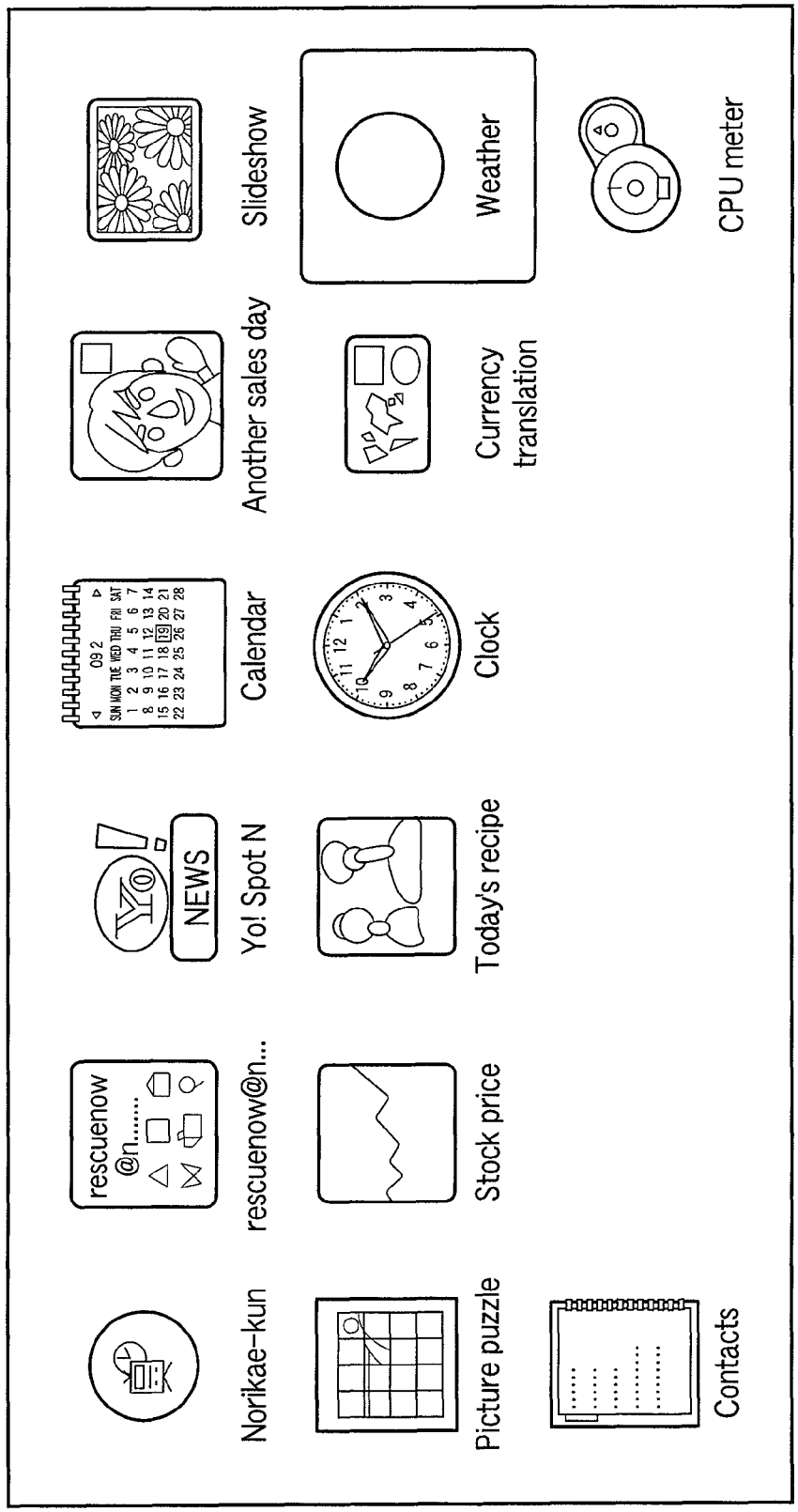
FIG. 6 is an exemplary diagram showing a specific example of widgets (information screens) that can be applied to a picture/audio reproducer (digital photoframe shown in FIG. 2) incorporated in the system depicted in FIG. 1, according to an embodiment.

FIG. 6 shows an example of held widgets (information screens) that can operate when registered in the widget registration unit 101 of the digital photoframe 100 described as an example of the picture/audio reproducer depicted in FIG. 2. Incidentally, as types of widgets (individual widgets), there are various widgets, e.g., one that introduces transport facilities which should be utilized to get to a destination, a necessary time, and others, one that reproduces news delivered periodically (several times a day), one that informs price information in a retail shop or a mass merchandise store registered in advance, one that informs stock prices and weather, and others.

Moreover, the widgets can be acquired through the network (Internet) or based on supply to the media input unit 163 via the semiconductor memory M as required. Of course, deletion of an already acquired widget or change of a widget to be operated can be performed as required based on replacement/new registration/deletion of widgets explained below.

Each of FIGS. 7 to 10 shows an example of a widget displayed in the picture/audio reproducer (digital photoframe) described in conjunction with FIG. 2. It is to be noted that reproduction conditions explained in conjunction with FIGS. 3 to 6 are applied to the digital photoframe described with reference to FIG. 2.

That is, widgets to be operated differ depending on presence/absence of a viewer or time information shown in FIG. 3 and a family ID depicted in FIG. 4. Additionally, when a keyword can be extracted from a conversation of viewers (persons present), specific widgets holding such a widget input information table as shown in FIG. 5 are operated, and information associated with the keyword is acquired and reproduced.

Figure 7:
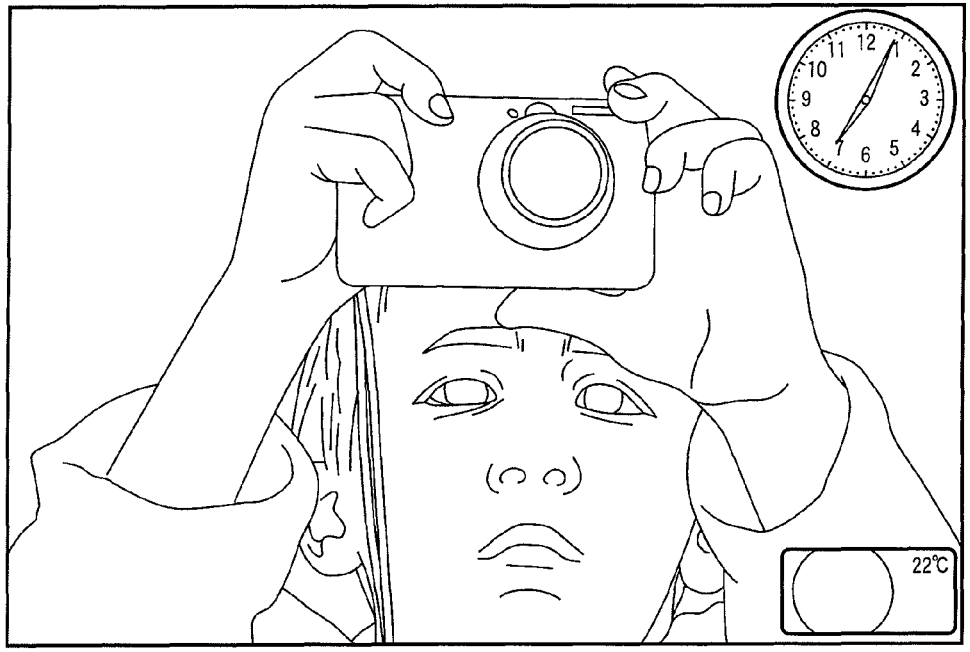
FIG. 7 is an exemplary diagram showing a display example of widgets displayed in the picture/audio reproducer (digital photoframe shown in FIG. 2) incorporated in the system depicted in FIG. 1, according to an embodiment.

FIG. 7 shows an image reproduction state of the digital photoframe 100 when widgets (for the largest number of viewers) having no limit (conditions) for viewers are operated.

That is, since there is no limit for specific viewers, time indication (clock) and a temperature (regional temperature) alone are displayed as activated widgets.

Figure 8:
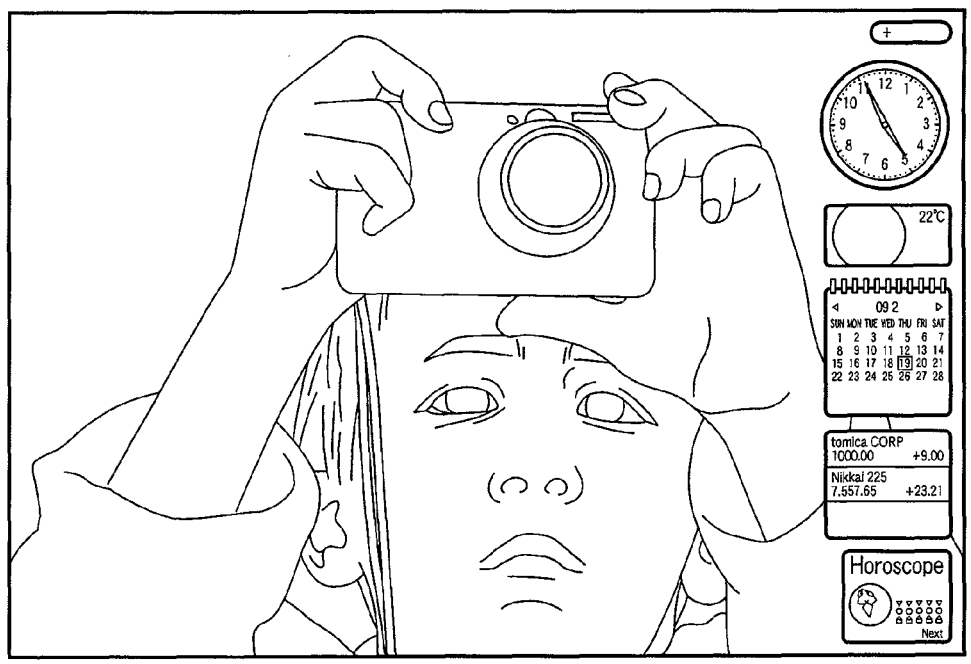
FIG. 8 is an exemplary diagram showing an example that the widgets (display) depicted in FIG. 7 are changed in accordance with a watching person (viewer), according to an embodiment.

FIG. 8 shows a combination of widgets which are operated when a viewer is a registration himself/herself and it is a person assumed to be a father based on the family ID depicted in FIG. 4.

That is, the registration himself/herself alone is assumed to be a viewer, and it is recognized that a calendar display widget, a stock price display widget, and others are added to the time indication (clock) widget and the temperature (regional temperature) widget.

Figure 9:
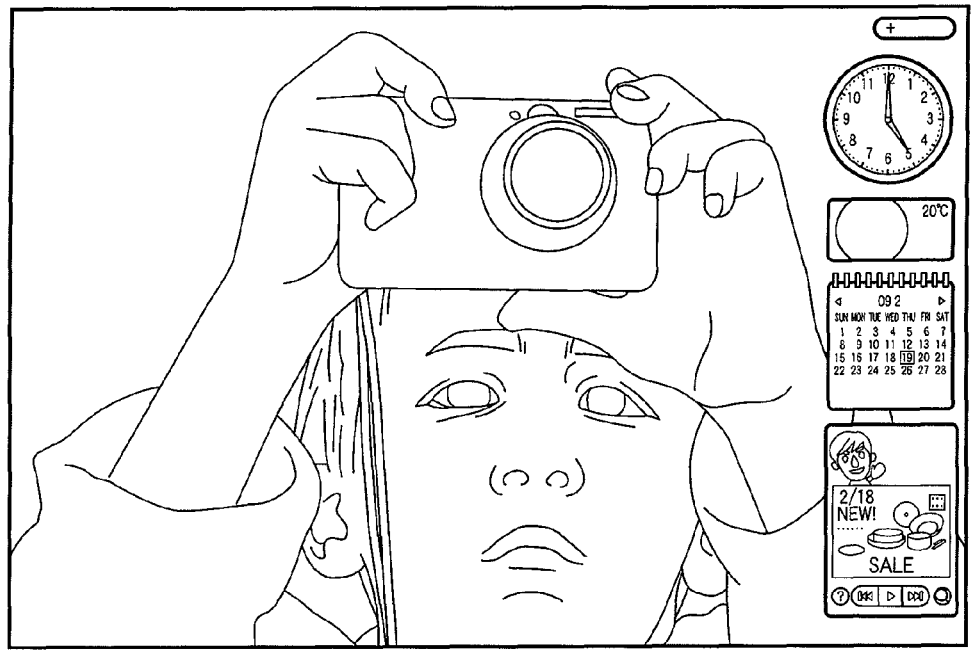
FIG. 9 is an exemplary diagram showing an example that the widgets (display) depicted in FIG. 7 are changed in accordance with a watching person (viewer), according to an embodiment.

FIG. 9 shows a combination of widgets which are operated when a viewer is a registration himself/herself and a person assumed to be a mother from the family ID depicted in FIG. 4 views in the morning (noon of the morning).

That is, the registration himself/herself alone is assumed to be a viewer, and it is recognized that the calendar display widget and a supermarket or mass merchandise outlet bargain information display widget are added to the time indication (clock) widget and the temperature (regional temperature) widget.

Figure 10:
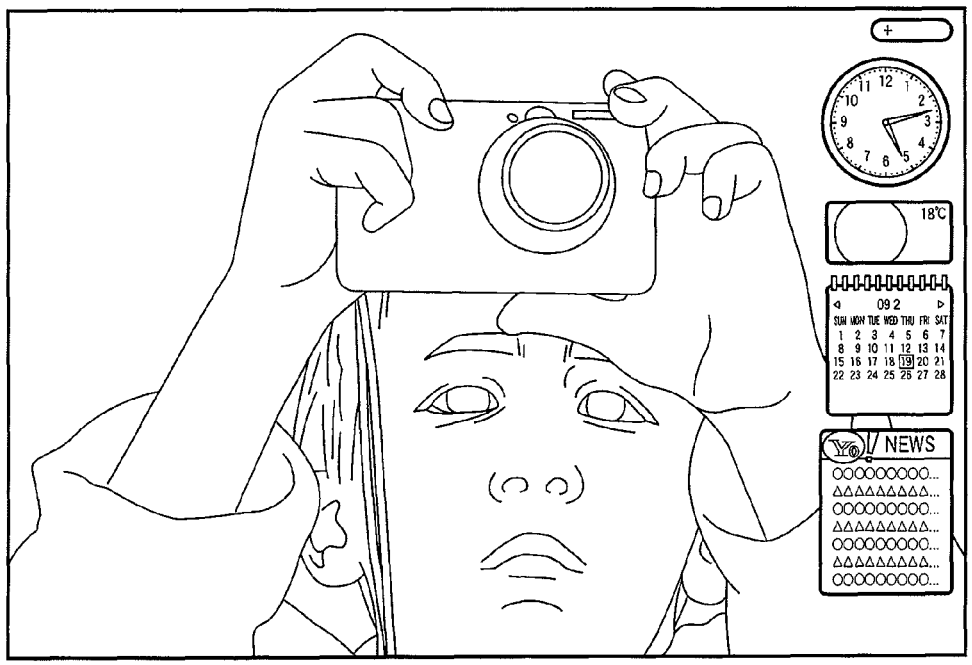
FIG. 10 is an exemplary diagram showing an example that the widgets (display) depicted in FIG. 7 are changed in accordance with a watching person (viewer) and a specific setting (time change) set by this person, according to an embodiment.

FIG. 10 shows a combination of widgets which are operated when conditions for a viewer comply with the example in FIG. 9 and a person assumed to be a mother from the family ID depicted in FIG. 4 is viewing at or after noon (from the daytime to the evening).

That is, as a combination of activated widgets in FIG. 10, it is recognized that a news reproduction widget is added to the time indication (clock) widget, the temperature (regional temperature) widget, and the calendar display widget.

When widgets to be activated are arbitrarily combined (combination is changed) based on presence information of viewers acquired by, e.g., a camera attached or provided to enable an interlocking operation and a time (time zone during which the widgets are reproduced), the single picture/audio reproducer can realize a widget reproducing operation that can provide information determined to be required by a viewer and each of his/her family members to the viewer present as if this operation is for individual person.

It is to be noted that, when the camera acquires presence information of a viewer as required and the viewer is absent, the widgets can be turned off, and a power supply of the display unit of the digital photoframe (television receiver) can be also turned off. Further, since presence (attendance) of the registration/family members/persons such as family members and the registration can be specified from facial information of viewers acquired by the camera, when a pet such as a cat or a dog alone is present in a room, the widgets can be likewise turned off, and the power supply of the display unit of the digital photoframe (television receiver) can be also turned off. This is also useful for an energy-saving demand at the present.

Figure 11B:
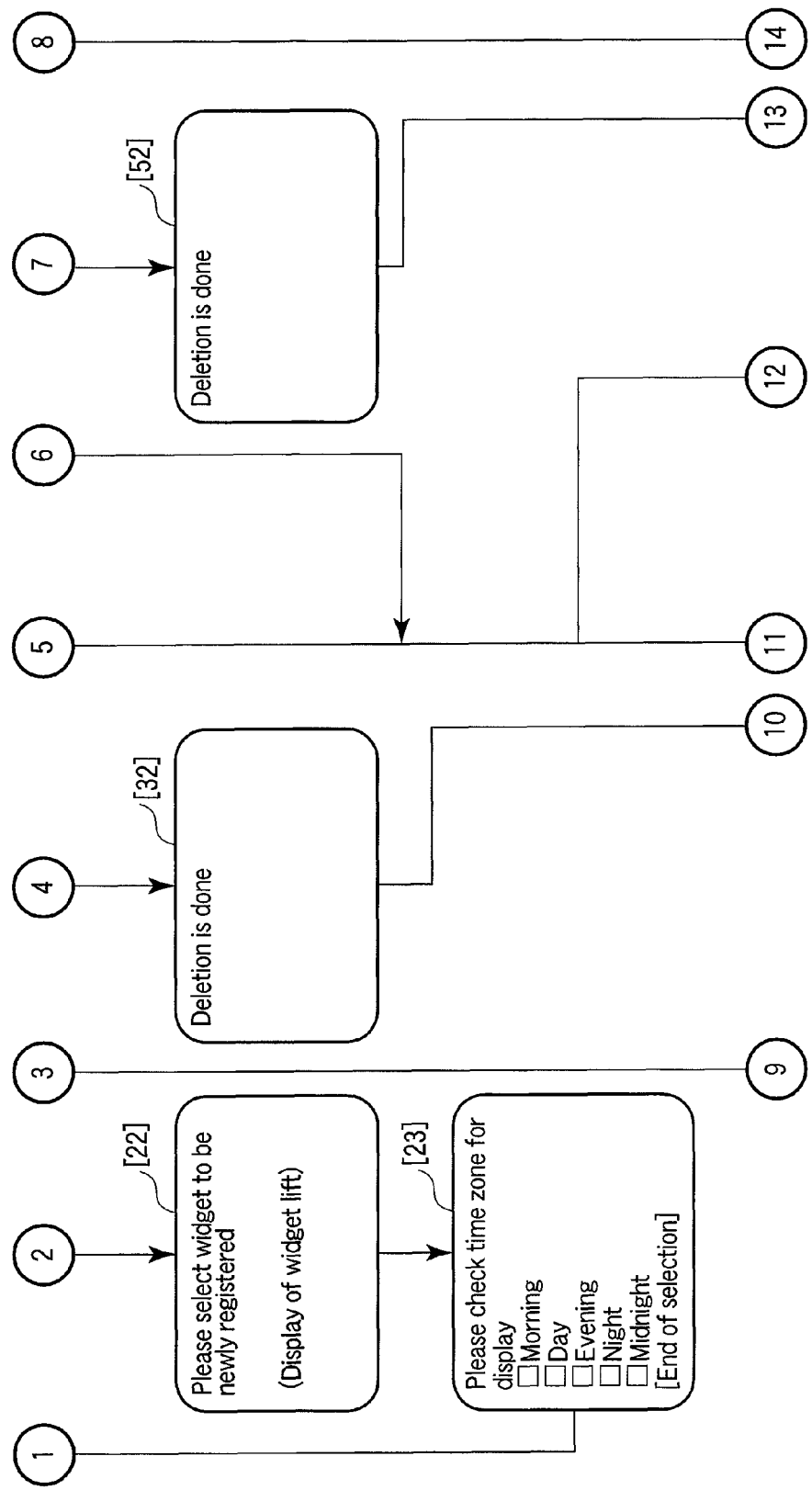
Figure 11C:
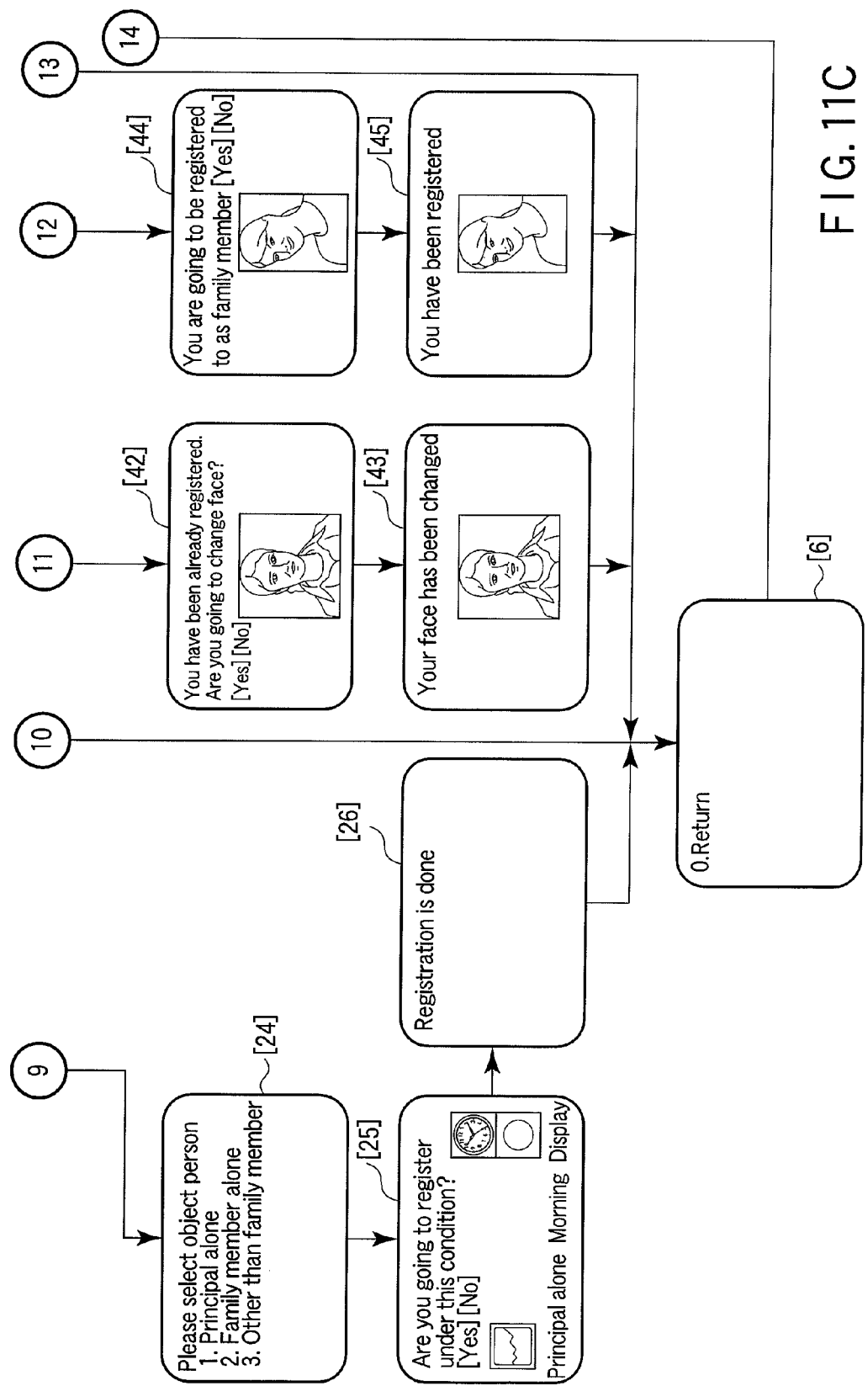

FIGS. 11A, 11B, and 11C show a procedure of registration and deletion of widgets and registration and deletion of viewers (family members) required to realize the display examples depicted in FIGS. 7 to 10 in terms of software based on a transition example of display screens.

When a widget setting mode is activated by operating, e.g., an attached remote controller terminal (not shown) or bringing an operator's finger into contact with a widget non-display region of the display unit 160, a setting screen that accepts an input signal which is used for selecting any one of subsequent instructions, i.e., registration/change of a widget (set)/deletion of a widget (set)/registration/change of a family member/deletion of a family member/end (return) and others is displayed like a screen [1]. The subsequent instructions are as follows:

1. Registration/change of widget (set) <<button [red]>>
2. Deletion of widget (set) <<button [blue]>>
3. Registration/change of member of family <<button [yellow]>>
4. Deletion of member of family <<[deletion] key>>
5. End (return) <<[return] key>>.

When a control command is issued by inputting a number or using a specific button from the remote controller terminal (not shown) or the like or when the operator's finger comes into contact with a predetermined character string in the screen (display unit) 160 to select a specific operation (input standby screen), various input screens indicated by [2] to [5] are displayed.

For example, when "Registration/change of widget (set)" is selected, the screen [2] is displayed, and a setting screen in which a subsequent instruction, i.e., a widget (set) to be registered (selected) can be input is displayed. The subsequent instruction is as follows:

Please select widget (set) to be changed—
1. New addition <<button [green]>>
2. Clock, calendar [arbitrary one]
3. Clock, power consumption, member of family
4. Clock, weather, temperature, special sale (morning)
5. Clock, weather, temperature, special sale
6. End (return).

For example, when "New addition" is selected, a screen [21] is displayed, and a setting screen in which a subsequent operation, i.e., a position of a first widget to be registered (selected) can be input is displayed. The subsequent operation is as follows:

Please select display position of [first] widget—
1. Display region
[upper left]
[upper right]
[lower left]
[lower right]
2. Move cursor to determine each of [upper left], [upper right], [lower left], and [lower right]
3. End (return).

Thereafter, when an arbitrary widget is selected from a display screen [22] (similar to a list screen depicted in FIG. 6), a widget which should be operated at a position set in the screen [21] is selected. Subsequently, in a screen [23], inputting a time zone during which the widget selected in the screen [22] should be activated is requested. It is to be noted that display of the screens [21] to [23] is sequentially repeated for the number of widgets to be set. Therefore, an operator can sequentially select widgets and input (select) activating positions (arrangement in the screen) and activating conditions (time zones). It is to be noted that, although the outline is shown in the screen [23], the activating conditions can be roughly classified as follows:

[Morning]
[Day]
[Evening]
[Night]
[Midnight]
[All time zones]
End (return).

When display positions and activation time zones are set with respect to all widgets to be selected, an input screen (screen [24]) in which a viewer at the time of activation is set is displayed, and termination of input (setting) by the operator is instructed (screen [25]), thereby completing registration (new addition) of the widgets ([a screen 26]). It is to be noted the viewer at the time of activation can be selected from the screen [24]. The screen [24] includes the following display items:

Principal
Father
Mother
Brother/sister (first one)
Brother/sister (second one)

All family members

All including persons other than family

End (return).

For example, when "Deletion of widget (set)" is selected in the screen [1], a screen [3] is displayed, and a setting screen in which a subsequent instruction, i.e., a widget (set) to be deleted can be input is displayed. The subsequent instruction is as follows:

Please select widget (set) to be deleted—

1. Clock, calendar [arbitrary one]
2. Clock, power consumption, member of family
3. Weather, temperature, special sale (morning)
4. Weather, temperature, special sale
5. End (return).

Thereafter, the selected widget (set) is displayed (screen [31]). When "Yes (or OK)" is selected in the displayed screen [31], the widget (set) displayed in the screen [31] is deleted.

On the other hand, for example, when "Registration/change of family member" is selected in the screen [1], a screen [4] is displayed, and a setting screen in which a subsequent instruction, i.e., addition or change of a family member can be input is displayed. The subsequent instruction is as follows:

Family member is going to be registered—

1. From address book <<button [green]>>
2. Shoot and register <<button [yellow]>>
3. End (return).

For example, when "Shoot and register" is selected, a screen [41] is displayed, the attached camera is utilized to take a picture of an operator's face, and the obtained picture is displayed. It is to be noted that "reshooting" is possible in this example (screen [41]).

Thereafter, when the operator in the obtained picture or a family member corresponding to a picture selected from the address book has been already registered, a setting screen in which a subsequent instruction, i.e., a change in picture can be input is displayed like a screen [42]. The subsequent instruction is as follows:

Has been registered

Are you going to change?

End (return).

On the other hand, when the operator in the obtained picture or a family member corresponding to a picture selected from the address book is not registered, a setting screen in which a subsequent instruction, i.e., a change of adding the family member in the picture can be input is displayed like a screen [44]. The subsequent instruction is as follows:

Are you going to register?

End (return).

It is to be noted that, when an already registered family member is to be deleted, selecting "Deletion of family member" in the screen [1] enables display of a picture of the family member as a deletion target like a screen [5], and an input screen in which the family member as the deletion target can be selected and input is displayed as follows:

Please select member of family—

Principle (picture->abcd?)

Father (picture->aacd?)

Mother (picture->bbcd?)

End (return).

Then, the family instructed to be deleted is deleted from the family ID management table described in conjunction with FIG. 4.

The registration or change of a widget (set)/the deletion of a widget (set)/the registration or change of a family member/the deletion of a family member is terminated by the simple operation in accordance with the above-described procedure.

Although an example will be shown in a screen [6], "Return" is displayed to enable canceling the input (setting) mode. Incidentally, it is needless to say that a standby mode during which messages that accept a subsequent operation such as those in the screen [1] are displayed to receive the next input may be continued.

Figure 12:
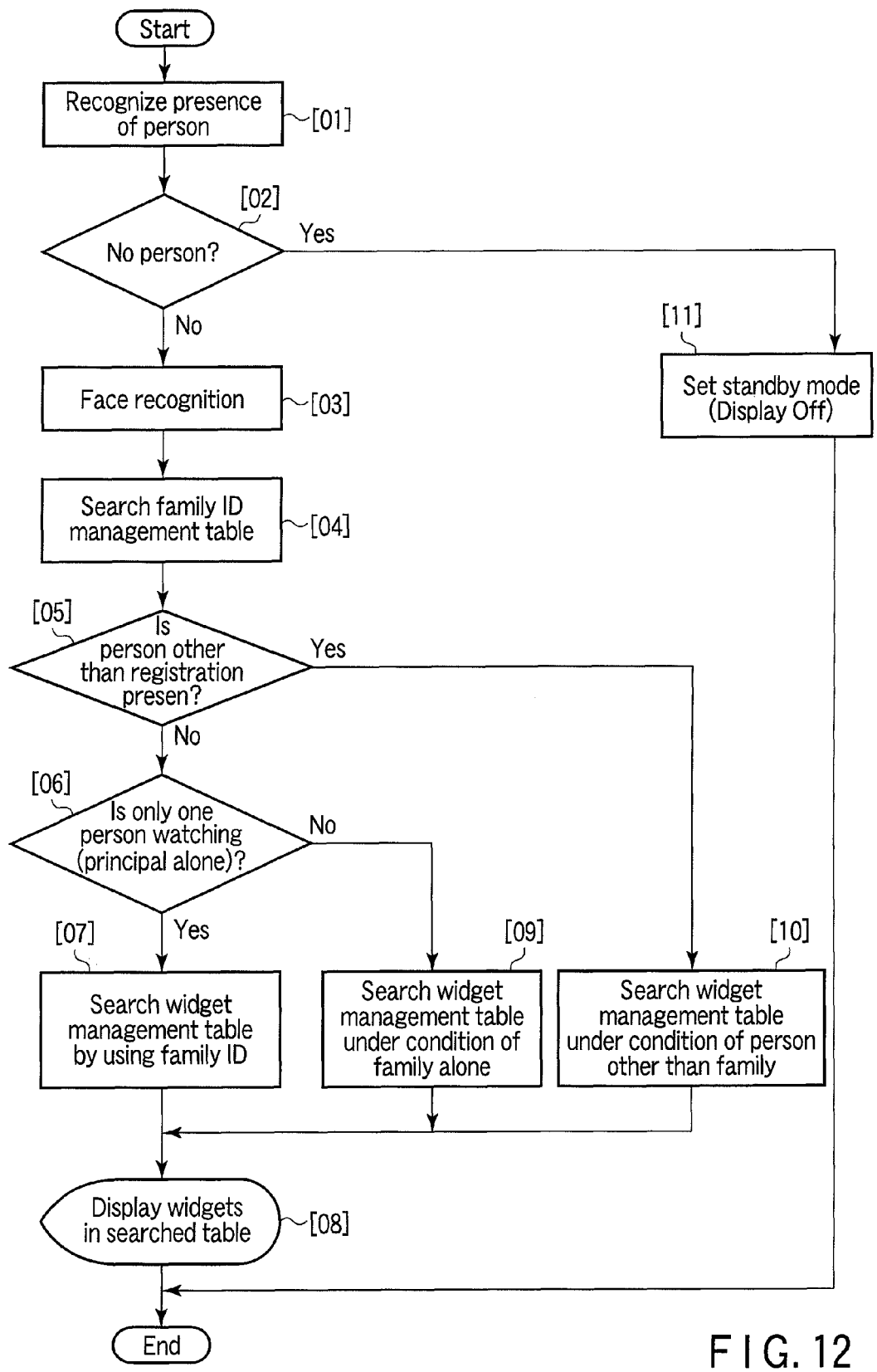
FIG. 12 is an exemplary diagram showing an example (flowchart) explaining in terms of software a method for detecting presence/absence of a viewer and reproducing a widget under conditions set in accordance with each viewer in the picture/audio reproducer (digital photoframe depicted in FIG. 2) incorporated in the system shown in FIG. 1, according to an embodiment.

FIG. 12 is a schematic view for explaining a process of realizing the selective activation of a plurality of widgets shown in FIGS. 7 to 10 in terms of software. It is to be noted that a target device in which each widget operates is the digital photoframe described in conjunction with FIG. 2, but the same effect can be obtained even though the television receiver or the PC (personal computer) depicted in FIG. 1 is used.

First, the affixed camera (100a) is activated, and whether a viewer (operator) is present near the device or in a room is checked [01].

When the operator (viewer) is not present [02-YES], the display (reproduction) of a picture (image) is not executed in the display unit 160, and a standby mode (picture is not displayed in the display unit 160) is maintained [11].

When the operator (viewer) is present [02-NO], a facial image is taken in by the camera, and it is recognized by the face authentication/collation unit 1 [03].

The facial image of the operator (viewer) recognized by the facial authentication/collation unit 1 is compared with facial image data of family members registered in the family ID management table exemplified in FIG. 4 to check whether corresponding facial image data is present [04].

First, whether a non-registration (other than family members) who is registered in the family ID management table is present is checked [05].

When the non-registration (other than family members) is present [05-YES], widgets that can be reproduced even if a person other than family members exemplified in FIG. 7 is present (present with the operator) are retrieved [10].

When a non-registration (other than family members) is not present [05-NO], whether the viewer is the operator (principal) alone and whether any family member is present with him/her are checked [06].

When the viewer is the operator (principal) alone [06-YES], widgets that are set to be activated for the operator are retrieved in accordance with the management table depicted in FIG. 3.

On the other hand, when the viewer is the operator (principal) and also has companies (one or more family members) [06-NO], widgets that are set to be activated with respect to the family members alone are retrieved [09].

Then, any one of the widgets (including a widget set) retrieved at one of the [10], [07], and [09] is activated [08].

When the persons other than the principal (operator) are present as the viewers, retrieving and activating (reproducing) pictures or audio to be reproduced, i.e., the widgets in accordance with a preset rule enables preventing pictures and others that the operator does not want third persons to see from being unwillingly reproduced, and the companies can be free from a situation where they see the pictures and others that the operator does not want other persons to see.

Figure 13:
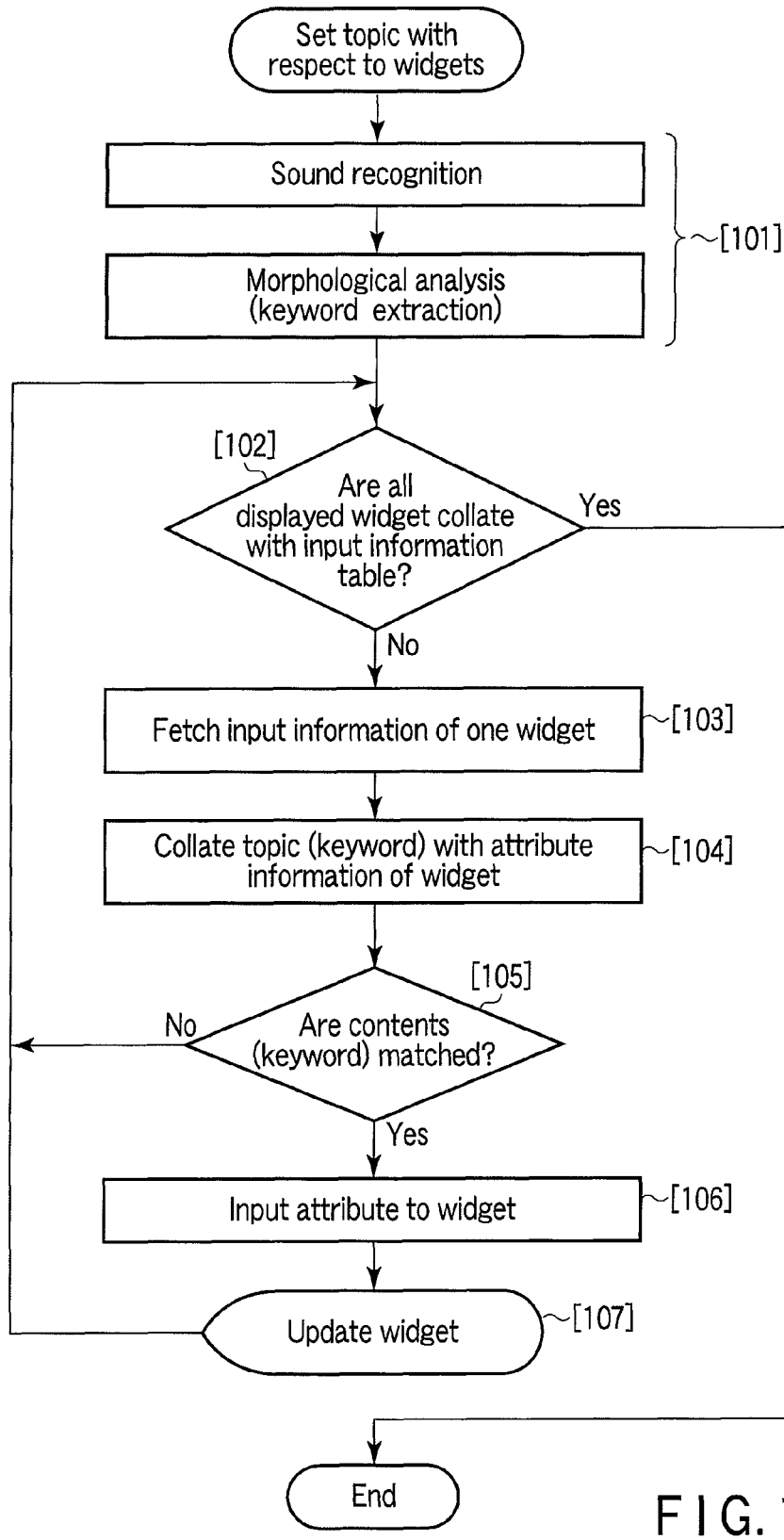
FIG. 13 is an exemplary diagram showing an example (flowchart) explaining in terms of software a method for changing content items of a widget that can provide information corresponding with a topic when this widget is selected in accordance with content items (topic) of a conversation of a viewer in the picture/audio reproducer (digital photoframe depicted in FIG. 2) incorporated in the system shown in FIG. 1, according to an embodiment.

FIG. 13 is a schematic view for explaining in terms of software that a new widget according to, e.g., a conversation of viewers is activated or content items reproduced by an already activated widget can be changed (in accordance with the conversation of the viewers) in a state where a specific widget has been already activated by using the input information table depicted in FIG. 5. It is to be noted that, in FIG. 13, a target device in which the widgets operate is also the digital photoframe described in conjunction with FIG. 2, but the same effect can be of course obtained even if the television receiver or the PC (personal computer) shown in FIG. 1 is used.

In a state that the attached camera 100a has detected that viewers are present near the digital photoframe, the audio recognition/morphological analysis unit 166 appropriately extracts a topic (keyword) from a conversation of the viewers in accordance with techniques of audio recognition and morphological analysis which have been extensively put to practical use [101].

Then, based on the acquired (extracted) keyword (topic), an arbitrary one is selected from currently displayed (activated) widgets, and the topic is collated with attribute information of the widget [103].

When the attribute information coincides with the topic as a result of the collation [105-YES], the attribute is input to this widget [106].

Then, the widget concerning the input attribute information is updated (in the widget concerning the attribute information, content items concerning the attribute information are reproduced) [07].

Further, whether the attribute information coincides (with the topic) is sequentially checked with respect to the currently activated remaining widgets [103] or [104]. It is to be noted that, when the collation of the attribute information with the topic is terminated with respect to all the widgets, the widgets concerning the attribute information are sequentially reproduced until the next topic is extracted [102].

For example, when the topic is "travel" and "weather", "gourmet", and others are activated as widgets, inputting the travel (destination) or a date and hour (days later) in the widget "weather" enables acquiring and reproducing weather (forecast) on a corresponding date and hour at the destination through the network. Furthermore, in the widget "gourmet", information concerning foods prominent at the same destination is acquired through the network and reproduced in the widget.

As explained above, in regard to an item which is considered to be desired or required by viewers, attribute information that can be displayed (reproduced) in a currently activated widget is fetched from a conversation of the viewers and set as a keyword, and the widgets having the same attribute information are sequentially reproduced (displayed) through the network or by making reference to, e.g., a built-in dictionary file, thereby improving the convenience of the viewers. It is to be noted that, when gender or an age group is determined based on facial image data acquired by the camera, content items of information which should be displayed by a widget acquired based on the attribute information can be further matched with preferences of viewers.

Figure 14:
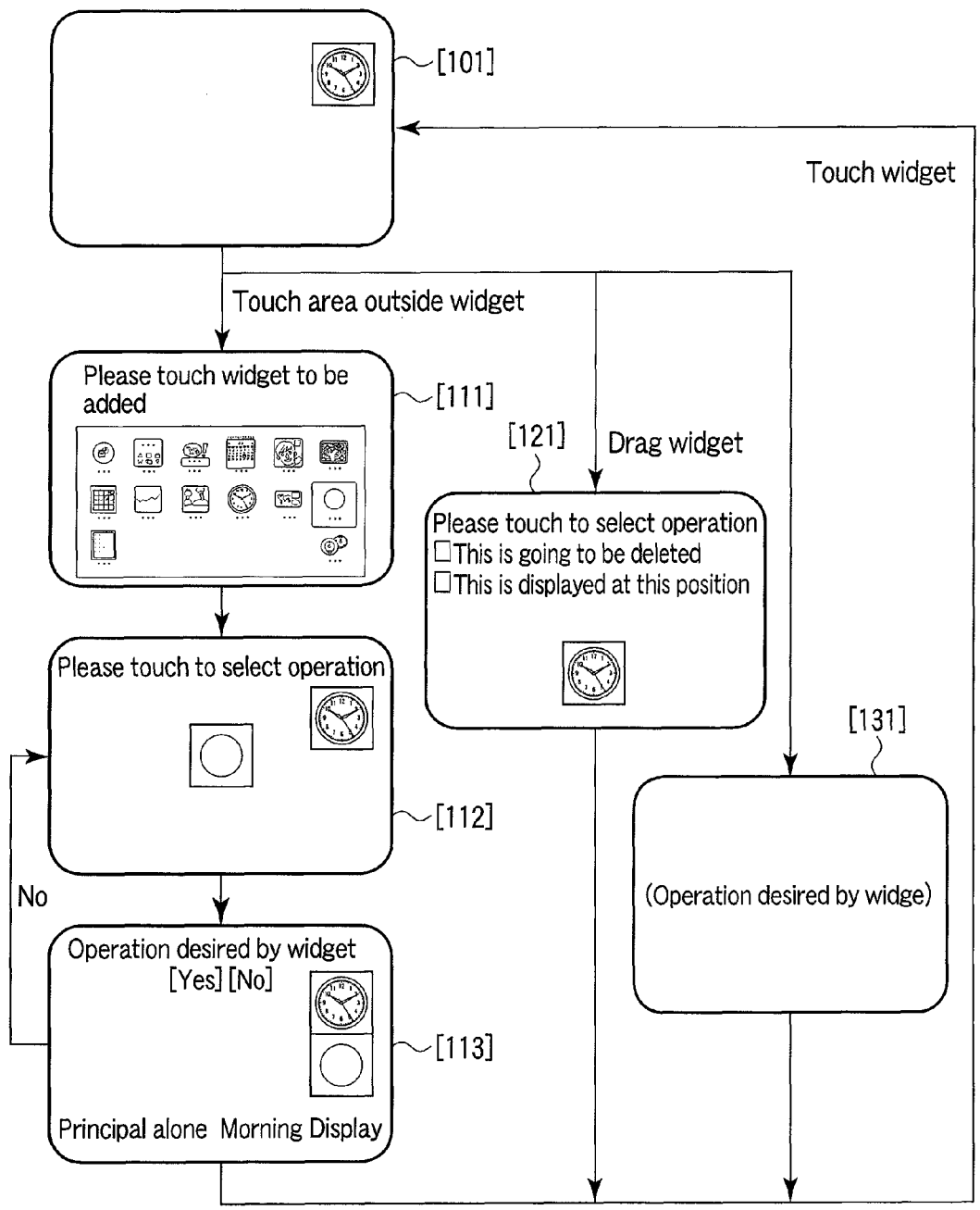
FIG. 14 is an exemplary diagram showing an example of an explanation on another example of the method for setting a widget that can meet specific conditions for each viewer to the picture/audio reproducer (digital photoframe depicted in FIG. 2) incorporated in the system shown in FIG. 1 (screen transition example), according to an embodiment.

FIG. 14 shows an embodiment that realizes registration and deletion of each widget described in conjunction with FIG. 11 as a transition example of the display screen.

When an operator touches a region where no widget is displayed in a state that arbitrary widgets are active (screen example [101]), a mode for adding a previously held widget is activated (screen example [111]).

A widget to be added is dragged in the screen example [111] (moving in the display region while maintaining a state that a finger of the operator is touching), and the finger is released at a position where the widget should be operated, whereby a widget selected in the screen example [111] is moved to the position where the widget should be operated and it is registered (screen example [112]).

When the widget dragged to the movement goal position in the screen example [112] can be activated, inputting "Yes (or "OK")" at this position enables adding the widget (screen example [113]).

On the other hand, when deleting the already registered widget (activated in the display region), touching the widget to be deleted enables activating a deletion mode and displaying a setting screen for confirming whether the widget selected for deletion is to be moved to that position (screen example [121]). It is to be noted that the operator can input an instruction to determine whether the widget is to be deleted or ongoingly utilized at the position to which the widget has been moved in the screen example [121].

Further, a widget that is displayed in the display region but not activated is activated when the operator touches the displayed widget, and an operation inherent to the widget (operation desired by the widget) is executed (screen example [131]).

It is to be noted that the example shown in FIG. 14 is an example of control for utilizing a touch screen function to add and delete (change an activating position) of a widget, and an arbitrary control method extensively utilized in a display device using a touch screen can be adopted. Furthermore, individual widgets can be arranged at arbitrary positions in the display region.

Moreover, as the operation inherent to the widget (operation desired by the widget), there are, e.g., "audio volume setting (change)", "track selection screen display", input settings from these screen, and others when the widget is, e.g., a "music player" and a function as the player is started by a touch operation (contact of a finger with respect to the widget) by an operator or the player is already operated. It is to be noted that, when the widget is, e.g., "weather forecast", "forecast target region change", "forecast target condition change (forecast for the next day or forecast for a week)", and others can be displayed.

FIG. 15 is a diagram explaining an example of the configuration of the face authentication/collation processing apparatus.

In the digital photoframe described in conjunction with FIG. 2, facial image data obtained by the attached camera 100a is acquired as facial information (facial image) by the face authentication/collation processing apparatus 1 to be subjected to authentication and collation. Incidentally, it is needless to say that processing other than the face authentication processing/collation processing is executed by a control unit (which is called a main control circuit 120 in the digital photoframe depicted in FIG. 2) of the device having the camera attached thereto (digital photoframe in this example).

The face authentication/collation processing apparatus 1 includes a main control unit 111 (for authentication/collation), an image interface unit 112, a communication interface unit 113, a face detection unit 114, a face collation unit 115, a storage unit 117, and others. It is to be noted that the storage unit 117 stores a collation database.

Although not shown, the main control unit 111 is configured by, for example, an MPU having a program memory and a work memory. The MPU executes a program (firmware) stored in the program memory to achieve various functions.

The image interface unit 112 is an interface for inputting, to the face authentication/collation processing apparatus 1, an image (bitmap data having a resolution corresponding to the number of pixels of the camera) taken by the camera 100a. Further, the communication interface unit 113 is an interface for communicating with the main control circuit 120 of the picture/audio reproducer.

The face authentication/collation processing apparatus 1 authenticates and collates the facial image taken in from the camera 100a in response to a request from the main control circuit 120, and feeds back the result to the main control circuit 120 via the interface unit 113.

The face collation unit 115 collates the facial image detected by the face detection unit 114 with facial image data of a particular person stored in the database in the storage unit 117 (database containing information corresponding to the facial image and the face feature point).

The face detection unit 114 detects the facial image of the person from the image taken by the camera 100a. At this point, the face detection unit 114 properly changes the tone or contrast of the taken image data to emphasize the outline. Thus, the edge of the shown facial image (e.g., the outline of the face, and the outlines of the eyes, nose and mouth) is highlighted so that patterns of the face including, for example, the eyes, nose and mouth can be easily detected. As a result, the boundary between an area where the facial image is located and an area where the surrounding background image is located is clearer, so that the background image part can be more easily deleted.

Furthermore, a two-dimensional region FA including the facial image is determined using, for example, a two-dimensional coordinate value originating from the upper left corner of a rectangular region including the facial image.

Then, while a face detection template (one or more standard face pattern prepared in advance) is being moved in the two-dimensional region FA of the facial image, a correlation value between the face pattern on the region FA and the standard face pattern prepared in advance is found by the face detection unit 114.

Thus, regarding the feature points (e.g., the eyes, nose and mouth) of the face pattern located at a particular position (x, y) represented by two-dimensional coordinates, the correlation value between this face pattern and the standard pattern is coded. The result is written in the face feature point of the destination management table 1001 of the server 1000 in FIG. 1. The row of the table 1001 where the face feature points are written is a row where an original facial image from which the correlation value of the face is found is registered (e.g., a correlation value code of the feature points of the face image registered in the row of ID=1 is written in the row of ID=1).

Now, it is assumed that a plurality of standard facial patterns of different sizes which are prepared in advance are gs(i, j) and a correlation of each standard facial pattern gs(i, j) and a local region (a region of, e.g., eyes, nose, or mouth) in an image f(x, y) in the two-dimensional region FA is Ms(x, y). In this case, for example, the correlation Ms(x, y) in the local region can be obtained as follows:

$$Ms(x,y) = \Sigma f(x+i, y+i) gs(i,j) / \{\Sigma f(x+i, y+i) \cdot \Sigma gs(i,j)\} \quad (1)$$

wherein gs(i, j) is a plurality of standard face patterns of different sizes prepared in advance, and Ms(x, y) is the correlation between the standard face patterns gs(i, j) and the local domain in an image f(x, y) of the two-dimensional region FA. Here, the standard facial patterns gs(i, j) of different sizes can be created by, e.g., averaging previously collected facial patterns of a predetermined size.

As a method of obtaining the correlation Ms, a known method can be adopted. As an example, there is "a verification medium issuing apparatus and an identity collating apparatus" disclosed in Japanese Patent Application Publication (KOKAI) 2003-108935 (KOKAI) for reference (paragraphs 0043 to 0057 in this publication disclose a specific example that can be utilized in face authentication/collation processing).

The main control circuit 120 of the picture/audio reproducer instructs the face authentication/collation processing apparatus 1 to perform face authentication/collation processing, and in response to the result of this processing, executes the above-described processing. Connected to this main control circuit 120 are: a display unit 121 for displaying a facial image and reproducing a video mail in accordance with the configuration of equipment; a speaker 122 for outputting audio notification of the reception of a mail and audio in a video mail; a audio synthesis unit 123 which has a audio data memory for the audio notification output from the speaker 122 and which synthesizes a audio signal from the audio data; a video memory 124 in which thumbnails, dialogues or pictograms to be displayed on the display unit 121 are expanded; a remote controller 125 for receiving user operations; a hard disk drive (HDD) 126 for storing video letters and other information; and a memory (IC card) 127 for storing the video letters and other information. It is needless to say that the face authentication/collation processing apparatus 1 can access the destination management table 1001 of the video letter server 1000 via the Internet or a home network, and suitably extract content items therein or suitably rewrite the content items (additional registration or deletion of unnecessary information). It is to be noted that, although not described in detail, the face collation unit 115 can estimate (determine) gender or an age group from a facial image as well known.

Further, the functions of the face authentication/collation apparatus 1 and the main control unit 120 of the picture/audio reproducer depicted in FIG. 15 can be incorporated in the electronic devices which are the various domestic user terminal devices shown by way of example in FIG. 1 (e.g., the television receiver 10, the recorder 20, the television receiver 200, the personal computer 300, the game machine 400, the cellular telephone 500, and others). However, the processing power for face authentication may be different in each device. For example, the television receiver 200 and the personal computer 300 can separately recognize even a plurality of faces present in one screen, while the game machine 400 and the cellular telephone 500 can recognize the face of only one user in front of the camera.

As described above, according to one embodiment, a picture that is displayed or content items that are reproduced when a viewer (operator) sees can be arbitrarily selected. Further, widgets that are simultaneously activated can be arbitrarily set in accordance with the viewer (operator). In particular, when there is only one viewer (operator) in a room (on the scene), the apparatus can be substantially utilized as the picture/audio reproducer realized as a terminal dedicated to each person. That is, when the operator (viewer) turns his/her eyes, information (for each person) can be obtained at a glance. It is to be noted that, when personal display conditions are once set, a subsequent operation is substantially unnecessary. In particular, pictures and others that are decided to be prevented from being shown to companies or family members are not reproduced except for a case that the operator alone is present, and hence whether each person who shares the picture/music reproducer is present does not have to be taken into consideration.

Moreover, according to one embodiment, an operation according to persons around is enabled by face recognition, and information or music according to each viewer can be automatically displayed or reproduced. Additionally, the means for selecting a person who is going to see widgets and the means for displaying the widgets are provided, and the registered widgets are displayed when the selected person watches a screen. Further, the time can be divided into time zones to display different widgets based on time information.

It is to be noted that the means for selecting a person who is not going to see widgets can be provided so that specific widgets are prevented from being displayed when a person who is set not to see is present. Contrary, when a viewer (operator) alone is present, all preset widgets can be reproduced.

Furthermore, according to one embodiment, a topic (keyword) can be acquired from a conversation of a viewer (operator) to present information having attribute that coincides with the acquired keyword.

It is to be noted that, when there is no viewer, stopping display can realize energy saving.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information reproducing apparatus comprising:
   a recorder configured to record viewer information based on information on a face recognized by a face recognizing processor;
   a setting processor configured to set information to be displayed on a display in accordance with the viewer information;
   an information reproducing processor configured to reproduce first information set by the setting processor on the display, if a face of a user recognized by the face recognizing processor is associated with the viewer information; and reproduce second information differing from the first information on the display, if a face of a user recognized by the face recognizing processor is not associated with the viewer information; and
   a reproduction position setting processor configured to permit a user to set a reproduction position of the first information or the second information on the display,
   wherein in a first time zone, the information reproducing processor reproduces information as the first information or the second information with a plurality of first applications, and in a second time zone differing from a first time zone, the information reproducing processor reproduces information with a plurality of second applications differing from the plurality of first applications, as the first information or the second information,
   wherein one or more applications are provided to reproduce information as the first information in the first time zone, the one or more applications being included in the plurality of first applications, and an application is provided to reproduce information as the second information in the first time zone, the application differing from the one or more applications included in the plurality of first applications,
   wherein one or more applications are provided to reproduce information as the first information in the second time zone, the one or more applications being included in the plurality of second applications, and an application is provided to reproduce information as the second information in the second time zone, the application differing from the one or more applications included in the plurality of second applications,
   wherein the plurality of first applications or the plurality of second applications are selectively operated in accordance with (i) whether a time zone in which the information reproducing processor reproduces the information is the first time zone or the second time zone, and (ii) whether the face recognizing processor recognizes a face of a viewer associated with the viewer information recorded by the recorder or a face of a viewer who is not associated with the viewer information,
   wherein a selectively operated one or ones of the plurality of first applications or the plurality of second applications are stopped when the viewer whose face is recognized by the face recognizing processor goes away from the display so that the face recognizing processor becomes unable to recognize the face of the viewer, and
   wherein the reproduction position setting processor include:
   a processing unit configured to enable, in a case of setting the reproduction position of said one of the first information and the second information, a user to set the reproduction position if a user moves a user's finger off an image of the first information or the second information at a desired position on a screen of the display after touching the image with the finger and dragging the image.

2. The information processing apparatus of claim 1, further comprising:
   a second setting processor configured to set a specific application, and specific viewer information on a second user, the second user being specified as a user to be prevented from viewing the specific application.

3. The information processing apparatus of claim 1, wherein the information reproducing processor reproduces different applications for a father and mother of a family, respectively, on the display.

4. A non-transitory computer readable medium having stored thereon a computer program which is executable by a computer, the computer program being provided to control the computer to execute the functions of:
   recording viewer information based on information on a face recognized by a face recognizing processor;
   setting first information to be displayed on a display in accordance with the viewer information;
   reproducing the first information on the display, if a face of a user recognized by the face recognizing processor is associated with the viewer information;
   reproducing second information differing from the first information on the display, if a face of a user recognized by the face recognizing processor is not associated with the viewer information;
   reproducing, in a first time zone, information with a plurality of first applications as the first information or the second information, and in a second time zone differing from the first time zone, information with a plurality of second applications differing from the plurality of first applications, as the other of the first information and the second information;
   wherein one or more applications are provided to reproduce information as the first information in the first time zone, the one or more applications being included in the plurality of first applications, and an application is provided to reproduce information as the second information in the first time zone, the application differing from the one or more applications included in the plurality of first applications,
   wherein one or more applications are provided to reproduce information as the first information in the second time zone, the one or more applications being included in the plurality of second applications, and an application is provided to reproduce information as the second information in the second time zone, the application differing from the one or more applications included in the plurality of second applications, wherein the plurality of first applications or the plurality of second applications are selectively operated in accordance with (i) a time zone in which the information reproducing processor reproduces the information is the first time zone or the second time zone, and (ii) whether the face recognizing processor recognizes a face of a viewer associated with the viewer information recorded by the recorder or a face of a viewer who is not associated with the viewer information, and wherein a selectively operated one or ones of the plurality of first applications or the plurality of second applications are stopped if the viewer whose face is recognized by the face recognizing processor goes away from the display so that the face recognizing processor becomes unable to recognize the face of the viewer, at time of setting the reproduction position of the first information or the second information, comprising;

enabling the reproduction position to be set when a user moves a user's finger off an image of the first information or the second information at a desired position on a screen of the display after touching the image with the finger and dragging the image on the screen.

5. The computer readable medium of claim 4, further controlling the computer to execute the function of setting a specific application and specific viewer information on a second user, the second user being specified as a user to be prevented from viewing the specification specific application.

6. The computer readable medium of claim 4, further controlling the computer to cause the display to reproduce different applications for a father and a mother of a family, respectively.

7. An information reproducing method comprising:
recording viewer information based on face feature point information recognized by a face recognizing processor;
setting first information to be displayed on a display in accordance with the viewer information;
reproducing the first information on the display, if a face of a user recognized by the face recognizing processor is associated with the viewer information;
reproducing second information differing from the first information on the display, if a face of a user recognized by the face recognizing processor is not associated with the viewer information; and
reproducing, in a first time zone, information with a plurality of first applications as the first information or the second information, and in a second time zone differing from the first time zone, information with a plurality of second applications differing from the plurality of first applications, as the first information or the second information, wherein one or more applications are provided to reproduce information as the first information in the first time zone, the one or more applications being included in the plurality of first applications, and an application is provided to reproduce information as the second information in the first time zone, the application differing from the one or more applications included in the plurality of first applications, wherein one or more applications are provided to reproduce information as the first information in the second time zone, the one or more applications being included in the plurality of second applications, and an application is provided to reproduce information as the second information in the second time zone, the application differing from the one or more applications included in the plurality of second applications, the plurality of first applications or the plurality of second applications are selectively operated in accordance with (i) whether a time zone in which the information reproducing processor reproduces the information is the first time zone or the second time zone, and (ii) whether the face recognizing processor recognizes a face of a viewer associated with the viewer information recorded by the recorder or a face of a viewer who is not associated with the viewer information, wherein a selectively operated one or ones of the plurality of first applications or the plurality of second applications are stopped if the viewer whose face is recognized by the face recognizing processor goes away from the display so that the face recognizing processor becomes unable to recognize the face of the viewer, and wherein at time of setting the reproduction position of the first information or the second information, the reproduction position is enabled to be set when a user moves a user's finger off an image of the first information or the second information at a desired position on a screen of the display after touching the image with the finger and dragging the image on the screen.

8. The information reproducing method of claim 7, further comprising:
setting a specific application and specific viewer information on a second user, the second user being specified as a user to be prevented from viewing the specification specific application.

9. The information reproducing method of claim 7, wherein different applications are reproduced for a father and a mother of a family, respectively, on the display.

* * * * *